United States Patent [19]
Szilagyi

[11] 4,030,692
[45] June 21, 1977

[54] MIRROR MOUNTING STRUCTURE

[75] Inventor: Jane M. Szilagyi, Center Valley, Pa.

[73] Assignee: Delbar Products, Inc., Perkasie, Pa.

[22] Filed: June 4, 1976

[21] Appl. No.: 693,028

Related U.S. Application Data

[63] Continuation-in-part of Ser. No. 586,334, June 6, 1975, abandoned.

[52] U.S. Cl. .............................................. 248/487
[51] Int. Cl.² ........................ A47G 1/12; B60R 1/06
[58] Field of Search .......... 248/466, 467, 475–488; 296/84 B; 350/302, 307

[56] References Cited

UNITED STATES PATENTS

| | | | |
|---|---|---|---|
| 2,315,260 | 3/1943 | Lancaster | 248/479 X |
| 2,326,316 | 8/1943 | Allen | 305/307 UX |
| 2,701,113 | 2/1955 | Koonter | 248/484 |
| 2,836,104 | 5/1958 | Bertell et al. | 248/480 X |
| 2,854,892 | 10/1958 | Stark | 350/307 UX |
| 3,199,075 | 8/1965 | Simmons | 350/307 X |
| 3,493,295 | 2/1970 | Kobrehel | 350/307 X |
| 3,599,927 | 8/1971 | Talbot | 248/484 |
| 3,820,877 | 6/1974 | Moyer | 350/307 X |

FOREIGN PATENTS OR APPLICATIONS

| | | | |
|---|---|---|---|
| 1,377,245 | 9/1964 | France | 350/307 |
| 2,117,620 | 10/1972 | Germany | 296/84 B |
| 1,963,460 | 7/1971 | Germany | 350/307 |
| 21,406 | 9/1906 | United Kingdom | 248/481 |

Primary Examiner—Lawrence J. Staab
Attorney, Agent, or Firm—Reising, Ethington, Barnard, Perry & Brooks

[57] ABSTRACT

The present invention relates to an outside rear view mirror assembly adapted to be mounted to a body portion of a vehicle wherein the bracket or support structure through which the mirror is mounted to the vehicle body is disposed within the interior of said body portion so as to eliminate such bracket or support structure from the exterior of the vehicle.

11 Claims, 10 Drawing Figures

MIRROR MOUNTING STRUCTURE

BACKGROUND OF THE INVENTION

1. Field of the Invention

This is a Continuation-in-Part of Ser. No. 586,334 entitled "Mirror Mounting Structure" filed June 6, 1975, and now abandoned.

The present invention relates to a mounting structure for an outside type rear view mirror. The mounting structure is particularly applicable to heavy-duty mirrors of the below-eye-level type such as are used with recreational vehicles or trucks. It is the basic objective of the present invention to provide a mirror support structure which is predominantly removed from the exterior of the vehicle. There are several important advantages to be achieved by the substantial elimination of an exteriorly disposed mirror supporting structure as achieved by the present invention.

It is well known to vehicle body designers that the addition of exteriorly disposed structures such as large rear view mirror systems, significantly reduce a vehicle's aerodynamic efficiency. It is, therefore, highly desirable to eliminate as much of such exterior structure as possible to minimize disruption of a vehicle's basic aerodynamic efficiency. Another problem with exteriorly mounted mirror support bracket structures, particularly those of the tubular type, is the creation of noise at high speeds. Through the substantial elimination of an exteriorly mounted bracket structure, the present invention enables there to be a substantial reduction in the high speed noise associated with currently used heavy-duty mirror mounting structures. A further disadvantage of an exteriorly disposed heavy-duty mirror bracket structure is its susceptibility to damage as well as its potential for causing injury to pedestrians. Thus, the present mirror support structure which is substantially disposed within the vehicle body reduces aerodynamic drag and wind noise while also greatly reducing the possibility of mirror damage and pedestrian injury.

2. Description of the Prior Art

Typical of a commonly used rear view mirror mounting bracket structure disposed exteriorly of the vehicle body is the arrangement shown in U.S. Pat. No. 3,667,718 Goslin. The Goslin patent discloses a below-eye-level mirror arrangement in which the mirror head is supported upon a rigid tubular bracket structure prominently disposed on the exterior of a vehicle body. It is particularly to avoid the noted disadvantages of mirror support structures such as shown in the Goslin patent that the present invention is directed. Applicant is unaware of any prior art teachings of a heavy-duty type below-eye-level mirror, particularly incorporating a fold-back feature, wherein the mirror arm support bracket structure is disposed within the vehicle body.

SUMMARY OF THE INVENTION

The present invention is directed to an outside rear view mirror assembly which includes an external support arm having a mirror head adjustably mounted to one end thereof and the other end of which arm projects within the vehicle body to be suitably supported therein upon an interior bracket assembly. More specifically, the body portion of the vehicle to which the mirror is adapted to be mounted includes an exterior wall or panel which defines one side of a chamber within the vehicle body and which wall includes an opening through which the mirror support arm is adapted to extend. An arm supporting bracket is fixed within the body portion chamber and is adapted to receive one leg of the mirror support arm. The interiorly disposed arm supporting bracket is so constructed and arranged as to clampingly engage the mirror support arm in such a way as to permit the latter to be rotated therewithin, allowing the mirror head to be adjusted to vary the horizontal rear field of view and also to permit the support arm and mirror to be folded back against the vehicle body to be maintained in a storage or safety position.

In one modification of the invention, the support arm bracket assembly is adapted to be installed within the body during assembly of the vehicle or, in the case where the mirror assembly is to be mounted on a door, by removal of the interior door panel. In either such case, the mirror and support arm are subsequently assembled to the interior bracket structure.

In another version of the invention, an opening is formed of sufficient size in the body wall member as to permit the assembled mirror head and support bracket to be dropped through the opening into the interior body chamber and the bracket thereafter secured to the body wall member. In this case an escutcheon or cover plate snugly engages the mirror support arm and encloses the wall opening.

Reference is now made to the drawings and following description wherein the invention is described in detail.

Figure 1:
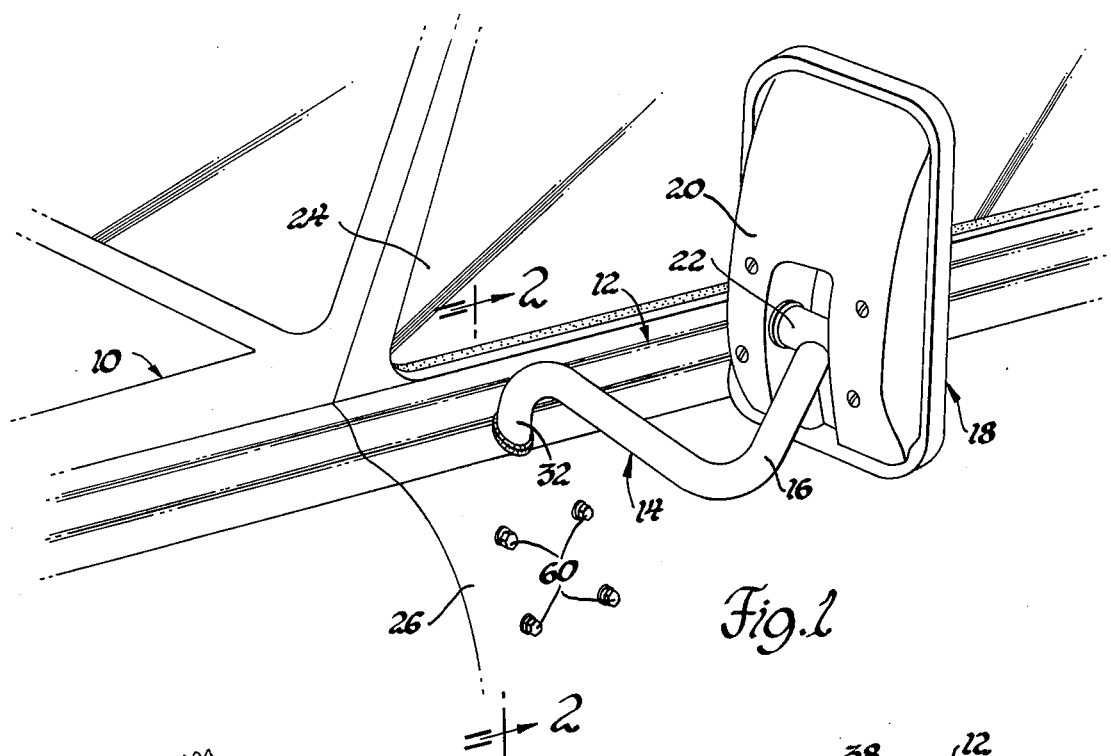
FIG. 1 is an assembly view showing an outside rear view mirror mounted upon a body portion of a vehicle.

Referring now to FIG. 1 of the drawings, a vehicle body is indicated generally at 10 and includes a front left door section 12. An angulated arm is indicated at 14 and includes an outer leg portion 16 to which a mirror head 18 is adjustably supported. Mirror head 18 includes a hollow backing plate 20 within which a conventional mirror element, not shown, is mounted for rear viewing. Leg portion 16 of arm 14 includes a horizontal end section 22 upon which the mirror head backing plate 20 is adjustably supported through a suitable internally disposed journal member, not shown. Thus, mirror head 18 is adapted to be adjusted about horizontal leg section 22 to vary the vertical rear view field of vision.

Figure 2:
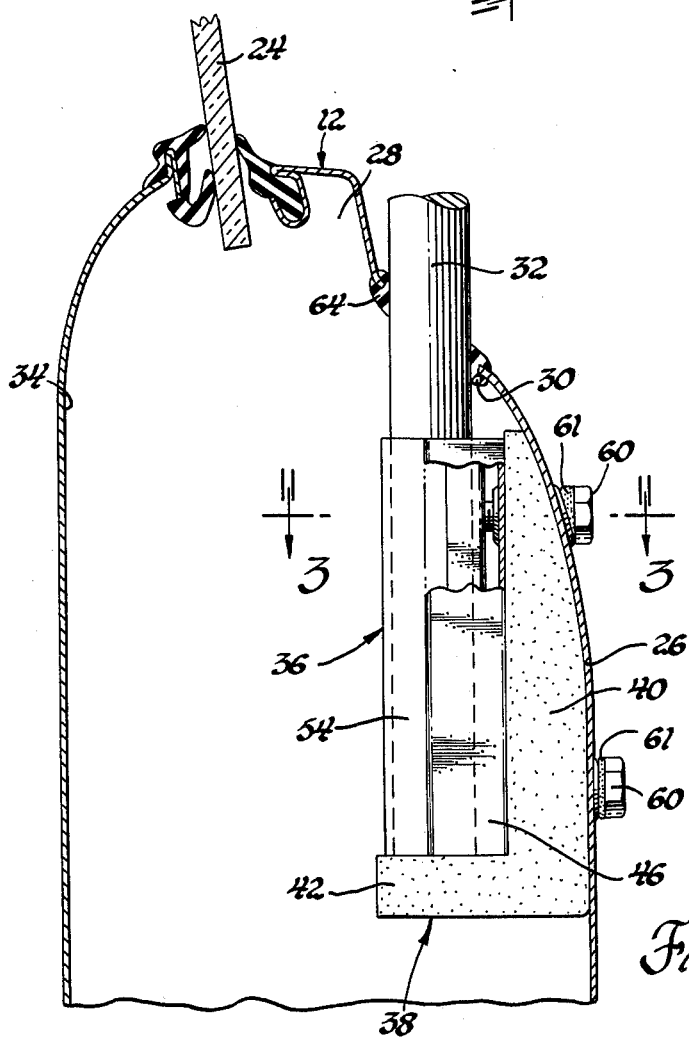
FIG. 2 is a sectional view through the door portion of a vehicle in detail the interiorly mounted support bracket structure.

As seen in FIG. 1 and 2, a window 24 is slidably mounted within door 12. Door 12 includes an outer wall panel 26 which defines one side of an inner body chamber 28. An opening 20 is formed in door wall 26 and communicates with interior chamber 28. Mirror support arm 14 includes a vertically depending leg portion 32 adapted to extend through wall opening 30 and project within body chamber 28. Door 12 includes an inside panel 34.

Figure 3:
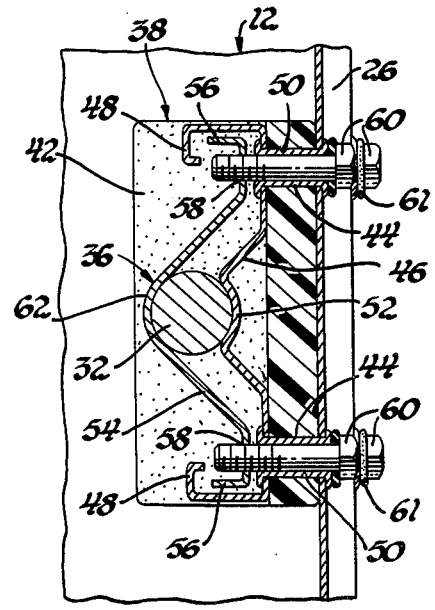
FIG. 3 is a view along line 3—3 of FIG. 2.

Referring to FIG. 2 and 3, a support bracket assembly is indicated generally at 36. Bracket assembly 36 includes an element 38 having a vertically extending portion 40 having an outer surface adapted to conform to the door contour; and a horizontal leg portion 42. A plurality of holes 44 are formed in the vertical portion 40 of element 38 and are adapted to be aligned with corresponding holes formed in outer door wall 26.

Bracket assembly 36 also includes a first plate member 46 having laterally extending leg portions which are turned inwardly to form channel portions 48. Plate member 46 also includes a plurality of holes formed therein and corresponding in number and aligned with holes 44 formed in element 38. Hollow rivet elements 50 are adapted to extend through the hole sets in door wall 26, element 38 and plate 46 so as to fix the element and plate to the interior of the door wall.

Plate 46 includes a centrally disposed vertically extending concave portion 52 centrally positioned intermediate channel portions 48.

Bracket assembly 36 includes a second plate member 54 having laterally extending end portions which terminate in inwardly extending rail portions 56 adapted to project within channel portions 48 of plate 46. Plate members 46 and 54 rest at their lower ends upon the horizontal portions 42 of element 38 whereby plate 54 is loosely retained by the channel portions 48 of plate 46 until final assembly is achieved.

Plate member 54 also includes a plurality of threaded holes 58 adapted to be aligned with the holes formed within plate 46 and element 38. Suitable stud members 60 are adapted to extend through hollow rivet members 50 and terminate in end portions adapted to threadably engage holes 58 in the second plate member 54. Elastomeric member 61 surround studs and coact with the stud heads to seal the rivet openings. Plate member 54 also includes a concave portion 62 formed intermediate rail portions 56 and adapted to be disposed opposite the concave portion 52 of plate member 46. Concave portions 62 and 52 of plate members 54 and 46 are adapted to receive and clampingly engage the vertically extending leg portion 32 of support arm 14.

It is intended that mirror support arm 14 will be frictionally supported within bracket assembly 36 to permit the arm to be rotatably adjusted therewithin to alter the horizontal rear view field of mirror head 18 and also to permit the mirror head and support arm to be rotated to a storage position wherein the mirror head is disposed closely against the vehicle body in a nonviewing storage position.

As best seen in FIG. 2, door wall opening 30 includes an elastomeric sealing member 64 disposed thereabout and adapted to snugly engage and laterally support leg portion 32 of arm 14. Thus, in addition to its support by bracket assembly 36, mirror support arm leg portion 32 is laterally supported around the area of its passage through outer wall 26. The additional lateral support of leg portion 32 proximate door opening 30 reduces the tendency of the mirror head 18 to vibrate due to its cantilever-type support on arm 14.

The mirror and bracket assembly shown in FIG. 1-3 may be assembled to the vehicle body as follows: prior to assembly of inner door panel 34 to door 12 or otherwise by removing such inner door panel, hollow rivet members 50 are passed through the holes in door wall 26 so as to project within chamber 28. Next, element 38 and first plate member 46 are mounted on rivet members 50 after which the inner ends thereof are peened over to fix said element and plate to wall 26. Plate member 54 is next loosely assembled within the channel portions of plate 46 and vertically supported upon element 38. Studs 60 are now inserted through hollow rivet members 50 and threadedly engaged with holes 58 of plate member 54. The mounted bracket assembly 36 is now ready to receive leg portion 32 of arm 14 which may be accomplished at any convenient time either in the factory or by a dealer. Should postfactory installation of the mirror head be intended, a temporary plug can be inserted in wall opening 30.

At such time as the mirror head 18 is to be mounted on vehicle 10, support arm leg portion 32 is inserted through body wall opening 30 and passed between the spaced concave portions 52 and 62 of plates 46 and 54. Once leg portion 32 is inserted within bracket assembly 36 so as to bottom on horizontal portions 42 of element 38, studs 60 may be tightened to draw plate member 54 toward plate member 46 to clampingly retain the leg portion within assembly 36. Studs 60 are tightened sufficiently so that arm 14 is normally frictionally restrained against unintended movement within assembly 36. However, arm 14 can be rotatably adjusted to any desired horizontal position relative to the door by simply overcoming the clamping force of plates 46 and 54 against leg portion 32.

Figure 4:
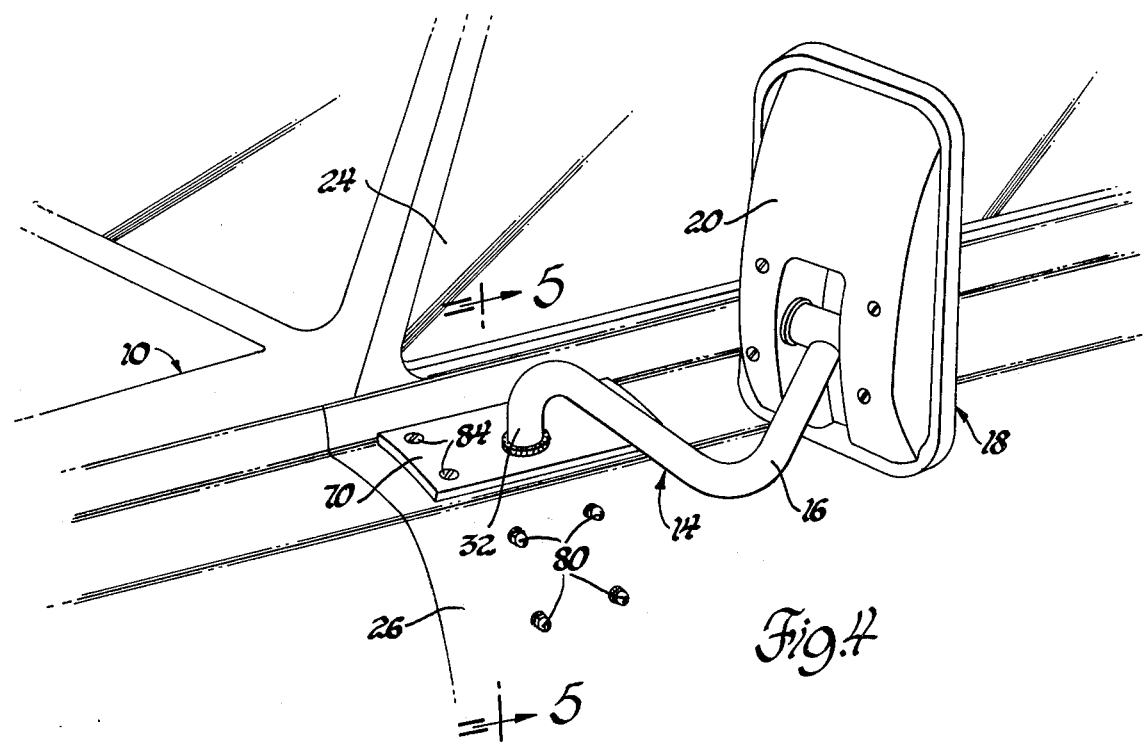
FIG. 4 is an assembly view showing another modification of the invention.
Figure 5:
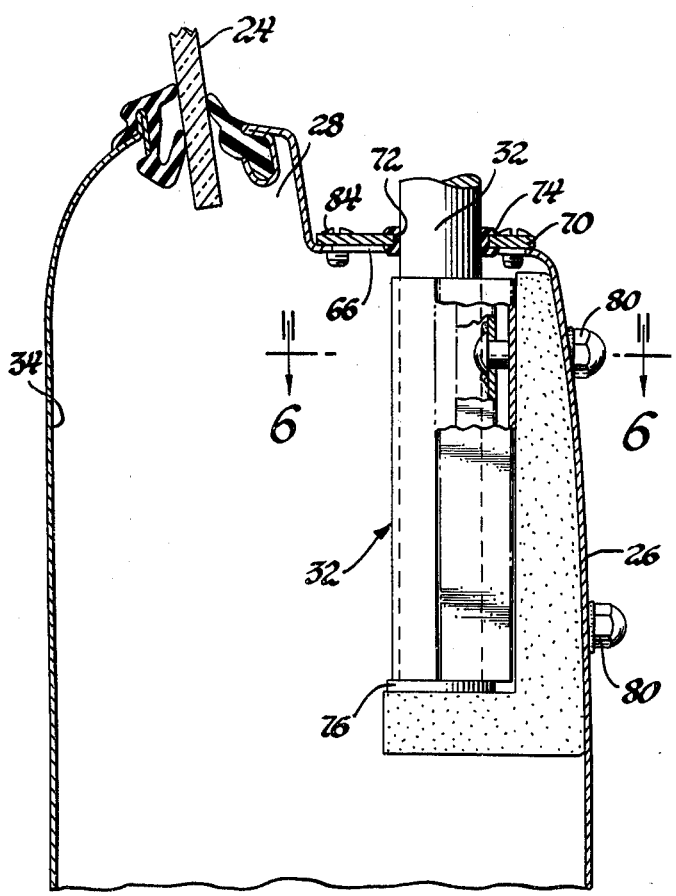
FIG. 5 is a view along line 5—5 of FIG. 4.
Figure 6:
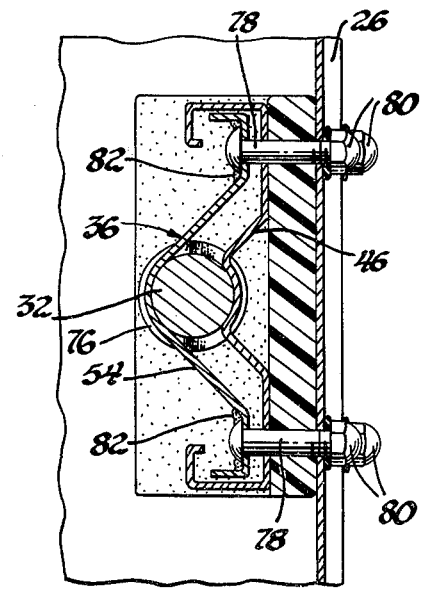
FIG. 6 is a view along line 6—6 of FIG. 5.

The modification of FIG. 4-6 is such as to permit preassembly of the arm 14 to bracket assembly 36 for subsequent external insertion and mounting within door chamber 28.

Except as hereinafter described in detail, the various elements of the mirror head and bracket assembly 36 are the same and bear the same numerals as those shown in FIG. 1-3. Referring now to the modification shown in FIGS. 4-6, outer body wall 26 includes an enlarged opening 66 of sufficient length and width to permit bracket support assembly 36 to be inserted there-through. In this case and prior to mounting bracket assembly 36 upon support leg portion 32, a cover plate 70 is first mounted upon said leg portion. Cover plate 70 includes an opening 72 slightly larger in diameter than that of leg portion 32 and around which opening is mounted a sealing element 74 snugly engaging said leg portion. As best seen in FIG. 5, the lower end of leg portion 32 includes a slightly enlarged end portion 76 which maintains bracket assembly 36 from slipping off leg portion 32 during the assembly operation.

Reference is now made to FIG. 6. Inasmuch as the bracket assembly 36 is preassembled to leg 32 of support arm 14, the need for rivet members 50 in the modification of FIGS. 1-3 is eliminated. Instead, stud members 78 are passed through the aligned holes in plates 54 and 46 and element 38. Studs 78 are of sufficient length to pass through outer body wall 26 where they are ultimately threadedly engaged by acorn-type nuts 80 and tightened to the appropriate degree to achieve the desired clamping pressure between plates 46, 54 and leg portion 32. In order to facilitate maintaining bracket assembly components in an assembled condition prior to mounting within body chamber 28 and to prevent the studs from rotating when the nuts 80 are threaded thereon, stud 78 are suitably fixed to plate member 54 by light brazing or suitable cementing indicated generally at 82.

It is to be understood, particularly with respect to the modification of FIG. 4-6, that bracket assembly element 38 may be eliminated whereby plate member 46 may abut directly against the interior of body wall 26. In such case, however, plate member 46 must be shaped so as to conform with the contour of outer door panel 26 whereby the bracket 36 will maintain support arm leg portion 32 in a generally vertical orientation after assembly.

Prior to the mounting of bracket assembly 36 within body chamber 28, and particularly if the mirror assembly is to be installed outside of the vehicle factory, a temporary closure member not shown, may close wall opening 66. At such time as the mirror assembly is to be mounted upon the vehicle, the temporary closure will be removed.

At the time of mirror assembly, support leg 32 and assembled bracket structure 36 are inserted through body wall opening 66 so that studs 78 project through the holes in wall 26. Acorn nuts 80 are next threaded upon the studs and adjusted to provide a suitable clamping force between plates 46, 54 and leg portion 32. Finally, escutcheon plate 70 is secured to body wall 26 through suitable screws 84.

Figure 7:
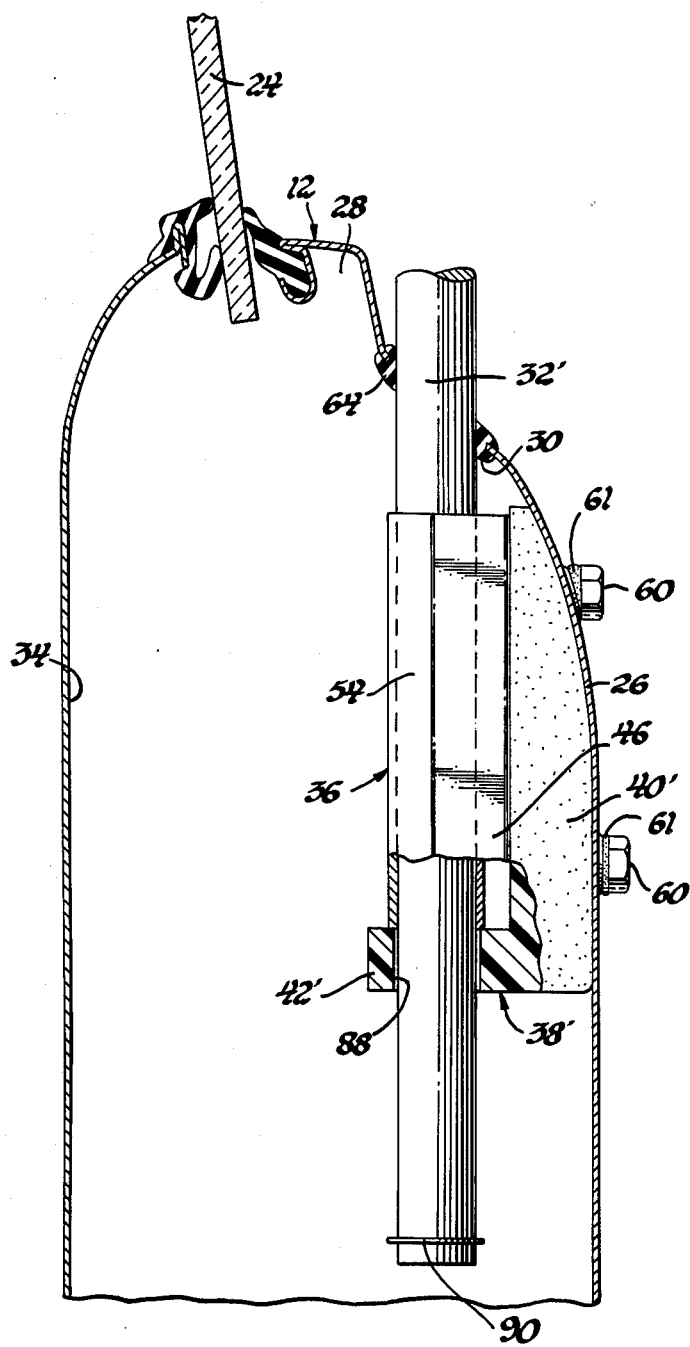
FIG. 7 is a further modification of the invention.

A further modification is shown in FIG. 7 whereby the vertical height of mirror head 18 may be adjusted. In this case the horizontal leg portion 42' of element 38' includes an opening 88. Leg portion 32' of support arm 14 extends through opening 88 and is of such length as to permit vertical adjustment within support bracket 36. such adjustment is achieved by loosening studs 60 and retightening the same when the proper vertical height of mirror head 18 is achieved. A removable stop washer 90 is fitted to the lower end of arm 32' to prevent the same from inadvertently being separated from bracket 36 during vertical adjustment of arm 14.

With certain vehicles, particularly those of the van type, it can be desirable to mount the mirror assembly forwardly of the front doors. More specifically, such mirror assembly may be mounted on the front fender or on the engine cowl portion of the vehicle so as to permit the mirror to be viewed directly through the windshield rather than through a side window. One of the advantages of thus locating a mirror assembly is that less movement of the operator's head away from straight ahead viewing position is required. A further advantage is the reduced tendency of the mirror to become misaligned due to repeated door slamming. Such locating and mounting of a mirror assembly forwardly of the front door is illustrated in FIG. 8 through 10 of the drawing.

Figure 8:
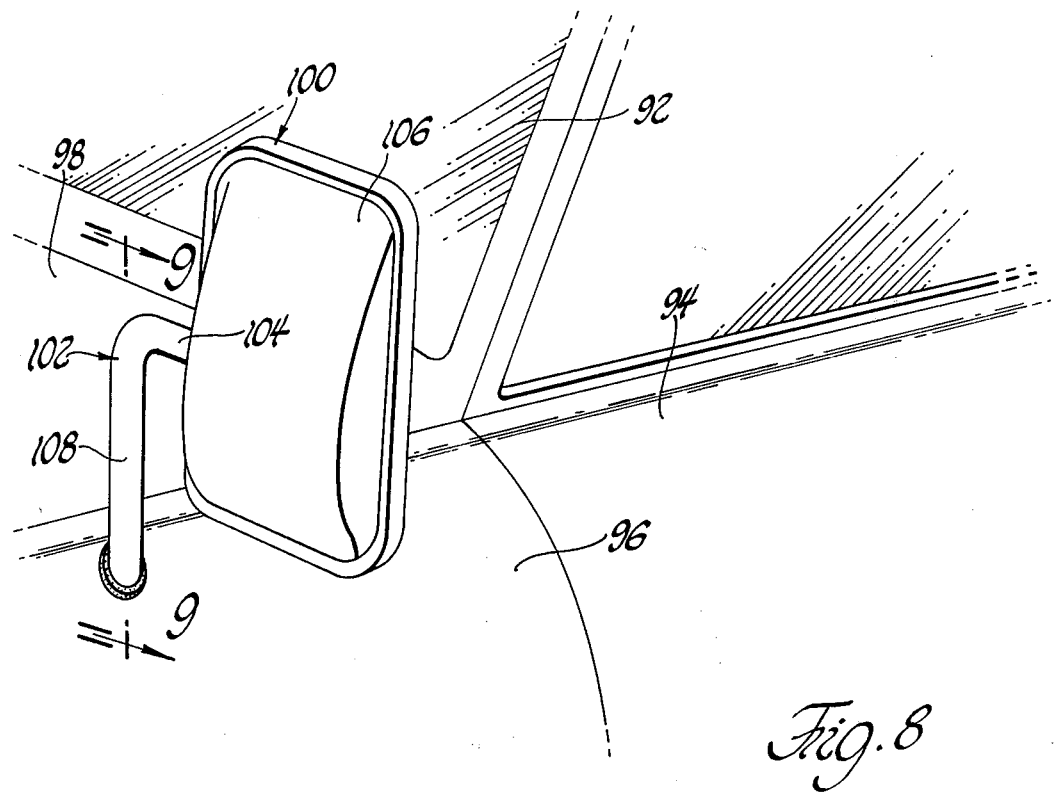
FIG. 8 is an assembly view of the mirror assembly mounted on a vehicle forwardly of the front door.

Referring to FIG. 8, the vehicle windshield is indicated at 92 and the front left door at 94. Portion 96 of the vehicle may be considered either the front left fender or the engine cowl area depending on the type of vehicle involved. Member 98 represents an engine compartment hood or closure cover.

A mirror assembly is indicated generally at 100 and includes a support arm 102 having a first portion 104 upon which a mirror head 106 is adjustably supported and a second portion 108 which projects internally of the vehicle body is supported therewithin.

Figure 9:
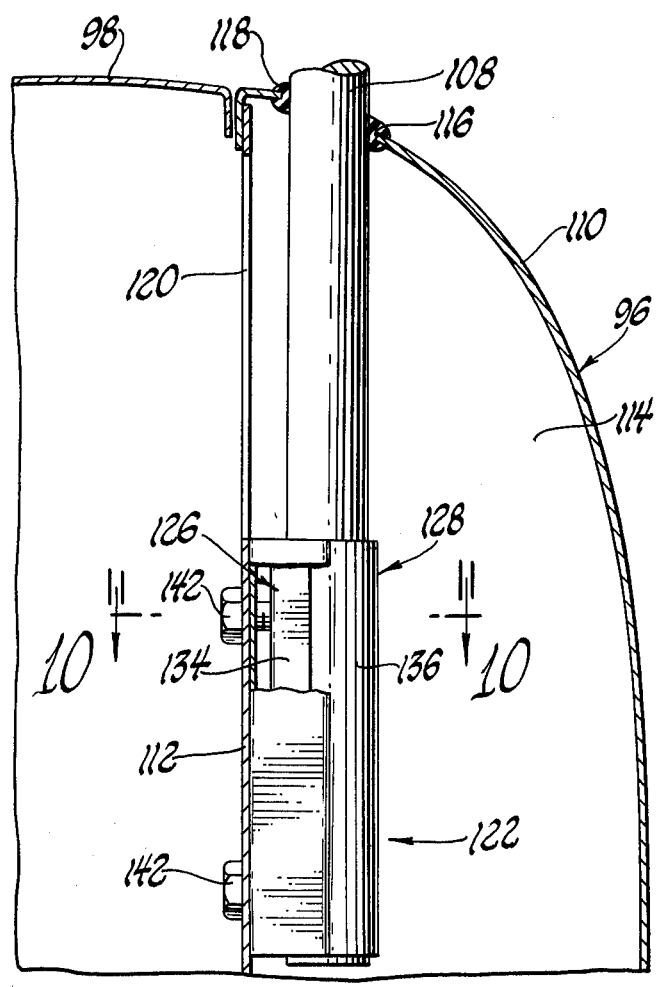
FIG. 9 is a view along line 9—9 of FIG. 8.
Figure 10:
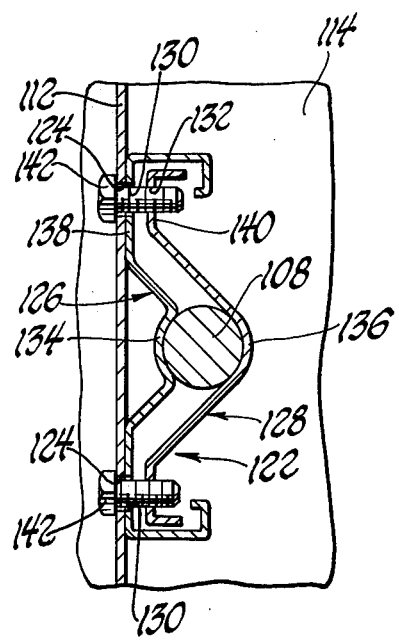
FIG. 10 is a view along line 10—10 of FIG. 9.

Referring more specifically to FIGS. 9 and 10, front body portion 96 includes an outer wall 110 and an interior wall 112 which coact to define a chamber 114. An opening 116 is formed in outer body wall 110 and includes a sealing grommet 118 adapted to receive therethrough leg portion 108 of support arm 102.

Particularly when mounting mirror assembly 100 forwardly of door 94, it is both possible and desirable to mount or support leg portion 108 of support arm 102 upon an interior wall of the body thereby eliminating unnecessary perforations in and fastening means on the outer body of the vehicle. In the event access to interior body chamber 114 is not otherwise available, an opening 120 is formed in interior wall 112 to permit a clamping bracket assembly 122 to be inserted therethrough. The purpose of bracket assembly 122 is to clampingly support leg portion 108 of support arm 102 upon interior body wall 112. While it is possible to form a portion of interior wall 112 so as to provide one element of the clamping assembly, it is a more versatile arrangement to provide the two-plate clamping bracket assembly particularly as illustrated in FIG. 10.

Once the location of hole 116 in outer wall 110 is determined, suitable holes 124 are formed in interior body wall 112. Bracket assembly 122 includes first and second plate members 126 and 128 having holes 130 and 132 corresponding generally in size and location to the holes 124 formed in interior wall 112. Plate members 126 and 128 respectively include vertically elongated journal bearing portions 134 and 136 which are adapted to cooperate to clampingly engage second leg portion 108 of support arm 102. Plates 126 and 128 include laterally extending leg portions 138 and 140 which contain the aforementioned holes 130 and 132.

Clamping bracket assembly 122 may be secured to interior body wall 112 in a variety of ways. A simple arrangement for thus mounting the bracket assembly is illustrated in FIGS. 9 and 10. In this case, the holes 124 and 130 respectively in interior wall 112 and first plate member 126 are slightly larger than the diameter of fastening studs or self-tapping screws 142. Thus, studs 142 are inserted in the holes 124 of interior wall 112 after which the first plate member 126 is loosely mounted thereon. Holes 132 in the second plate member 128 are formed such that this plate is threadably engaged by studs or screws 142. Before plate 128 is threaded toward first plate member 126 and interior wall 112, support arm leg portion 108 is passed through exterior wall hole 116 and grommet 118 so as to extend between the journal bearing portions 134 and 136 of plates 126 and 128. After the support arm is thus in position, studs 142 are tightened so as to draw the second plate member 128 into clamping engagement with leg portion 108 and in turn against the first plate member 126. the degree of clamping pressure between plates 126, 128 and leg portion 108 will be determined by the degree of tightening of the studs. Once such clamping pressure is set, it should be unnecessary thereafter to vary such unless and until it is desired to remove the mirror assembly.

I claim:

1. An outside rear view mirror assembly adapted to be mounted to a body portion of a vehicle and which body portion includes an exterior wall member defining one side of a chamber within the vehicle body, an opening in said wall member and communicating with said chamber, said assembly comprising a mirror head, a support arm adapted to be mounted upon said exterior wall, member said support arm including a first leg portion disposed exteriorly of the vehicle body, means for adjustably supporting the mirror head upon said first leg portion, said supporting arm including a second leg portion extending through said wall opening and projecting within said body chamber, bracket means disposed within said body chamber, said bracket means including first and second plate members, means for fastening said first plate member to said exterior wall member, and means for adjustably connecting said first and second plate members for clamping and rotatably supporting said second leg portion therebetween.

2. An outside rear view mirror assembly as set forth in claim 1 in which said first and second plate members include oppositely disposed recessed portions which coact to receive and support said second leg portion therebetween.

3. An ouside rear view mirror assembly as set forth in claim 1 in which said first plate member includes a pair of spaced channel portions, said second plate member including a pair of end portions adapted to extend within said channel portions to loosely retain said second plate member to said first plate member.

4. An outside rear view mirror assembly as set forth in claim 1 in which the means for fastening said first plate member to said exterior body wall includes an L-shaped bracket member having a vertical portion adapted to abut against said wall member and a horizontal portion extending inwardly relative to said wall member, said plate members including lower ends terminating against the horizontal portion of the L-shaped bracket member.

5. An outside rear view mirror assembly as set forth in claim 1 in which the means for fastening the first plate member to said exterior wall member includes a plurality of sets of aligned holes formed in said first plate member and said exterior wall member, a hollow rivet member extending through each set of aligned holes and fastening the first plate member to the exterior wall member, said second plate member including a plurality of threaded holes aligned with the holes in said first plate member, the means for adjustably connecting said plate members comprising bolt elements extending through said hollow rivet members and threadably engaging with the holes in said second plate.

6. An outside rear view mirror assembly adapted to be mounted to a body portion of a vehicle and which body portion includes an exterior wall member defining one wall of a chamber within the vehicle body, an opening in said wall member and communicating with said chamber, said assembly comprising a mirror head, a support arm adapted to be mounted upon said exterior wall, said support arm including a first leg portion disposed exteriorly of the vehicle body, means for adjustably supporting the mirror head upon said first leg portion, said supporting arm including a second leg portion extending through said wall opening and projecting within said body chamber, closure means coacting with said exterior wall member and the second leg portion to seal the wall opening and laterally support said second leg portion, bracket means disposed within said body chamber in spaced relation to said wall opening, means for fixing said bracket means to said exterior wall member, said second leg portion being supported for rotary adjustment to said bracket means, said wall opening being of sufficient size as to permit said bracket means to pass therethrough, said closure means comprising a plate having an opening through which said second leg portion projects and means for securing said plate to said exterior wall member.

7. An outside rear view mirror assembly as set forth in claim 6 and including an elastomeric seal member mounted within said plate opening and snugly engaging said second leg portion.

8. An outside rear view mirror assembly adapted to be mounted to a body portion of a vehicle and which body portion includes inner and outer wall members defining a chamber within the vehicle body, an opening in said outer wall member and communicating with said chamber, said assembly comprising a mirror head, a support arm adapted to be mounted within said body chamber, said support arm including a first leg portion disposed exteriorly of the vehicle body, means for adjustably supporting the mirror head upon said first leg portion, said supporting arm including a second leg portion extending through said wall opening and projecting within said body chamber, bracket means disposed within said body chamber, said bracket means including first and second plate members, said second leg portion of the support arm extending between and clampingly engaged by said first and second plate members and means for adjustably connecting said first and second plate members and retaining said bracket means and support arm upon one of said wall members.

9. An outside rear view mirror assembly adapted to be mounted to a body portion of a vehicle and which body portion includes interior and exterior wall members defining an interior vehicle body chamber, an opening in said exterior wall member and communicating with said chamber, said assembly comprising a mirror head, a support arm adapted to be mounted within said interior body chamber, said support arm including a first leg portion disposed exteriorly of the vehicle body, means for adjustably supporting the mirror head upon said first leg portion, said supporting arm including a second leg portion extending through said wall opening and projecting within said body chamber, a bracket assembly disposed within said interior body chamber, said bracket assembly including plate means for clamping and rotatably supporting said second leg portion upon one of said wall members, and fastening means for adjustably supporting said plate means upon one of said wall members and for setting the amount of clamping pressure between said plate means and the second leg portion of the support arm.

10. An outside rear view mirror assembly adapted to be mounted to a body portion of a vehicle and which body portion includes interior and exterior wall members defining an interior body chamber, an opening in said exterior wall member and communicating with said chamber, said assembly comprising a mirror head, a support arm adapted to be mounted within said interior body chamber, said support arm including a first leg portion disposed exteriorly of the vehicle body, means for adjustably supporting the mirror head upon said first leg portion, said supporting arm including a second leg portion extending through said wall opening and projecting within said interior body chamber, a clamping bracket assembly disposed within said interior body chamber, said bracket assembly including first and second plates having vertically elongated journal bearing surfaces which coact to clampingly engage said second leg portion therebetween, and means for securing said plates in clamping relation with said second leg portion and supporting said bracket assembly upon one of said wall members.

11. An outside rear view mirror assembly as set forth in claim 10 wherein said bracket assembly is mounted on said interior wall member.

* * * * *